Jan. 14, 1964 R. SCHOEPPELL 3,117,399
METHOD AND APPARATUS FOR TOOL GRINDING
Filed Aug. 8, 1961 3 Sheets-Sheet 3
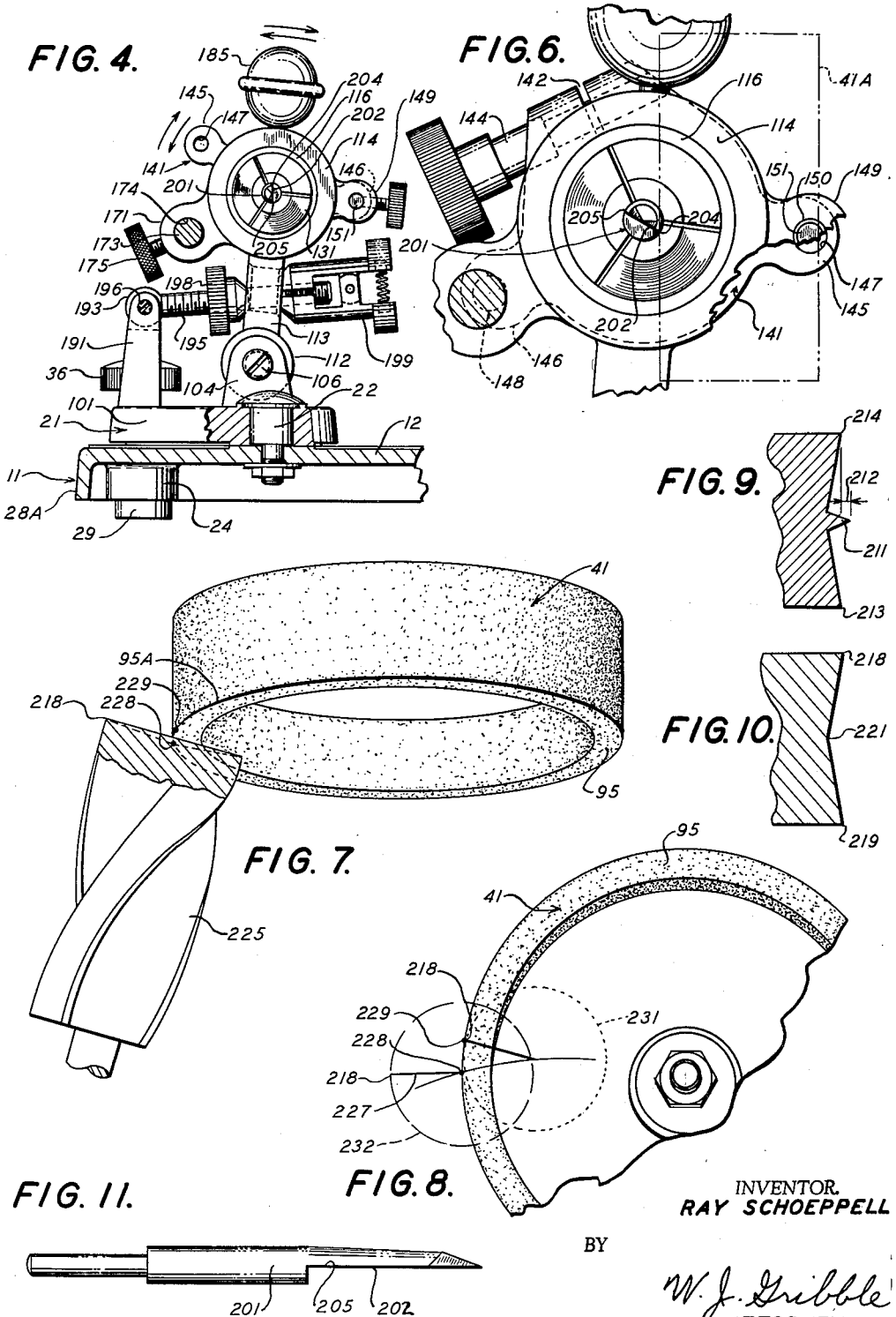
INVENTOR.
RAY SCHOEPPELL
BY
W. J. Gribble
ATTORNEY

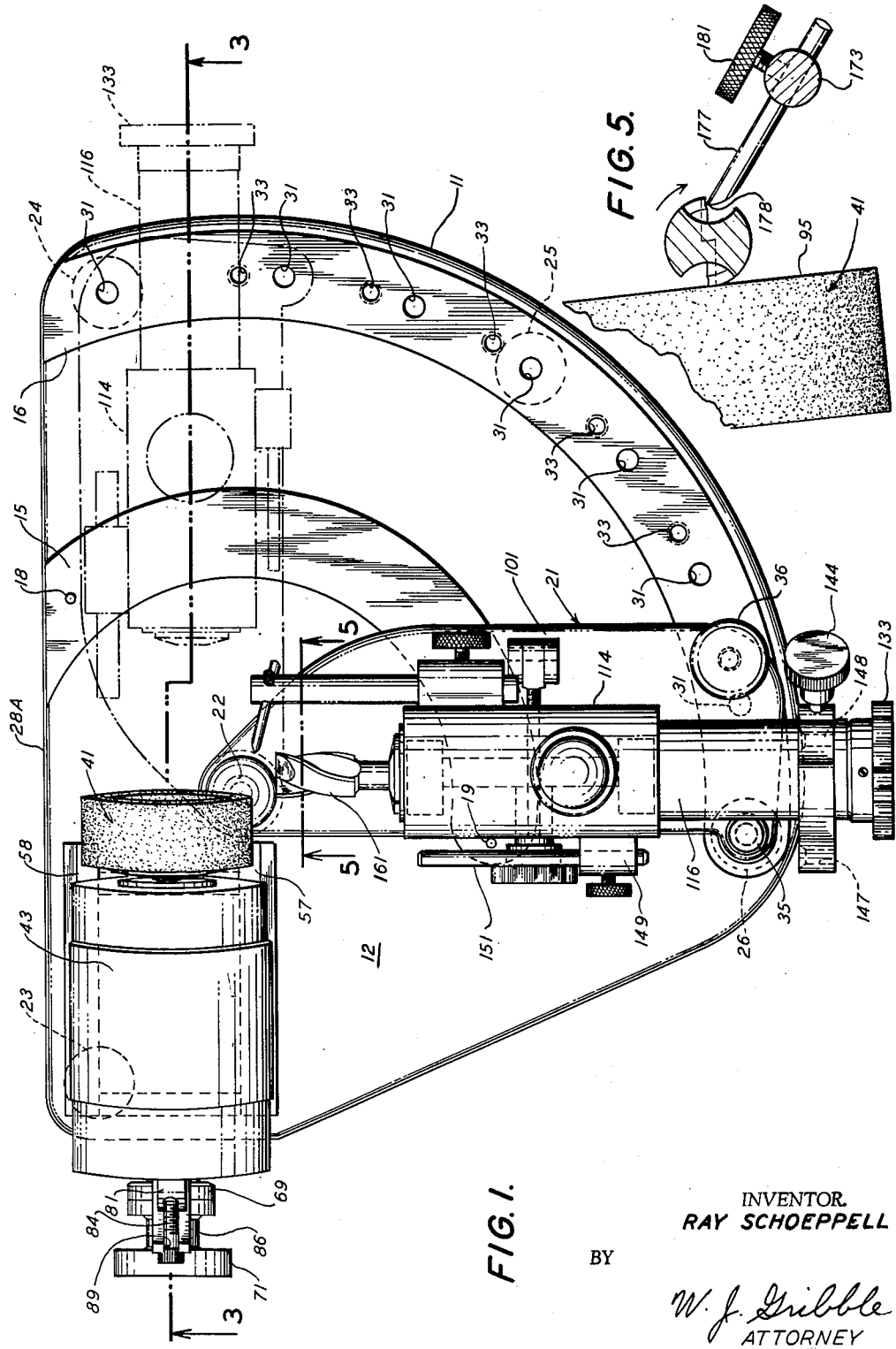

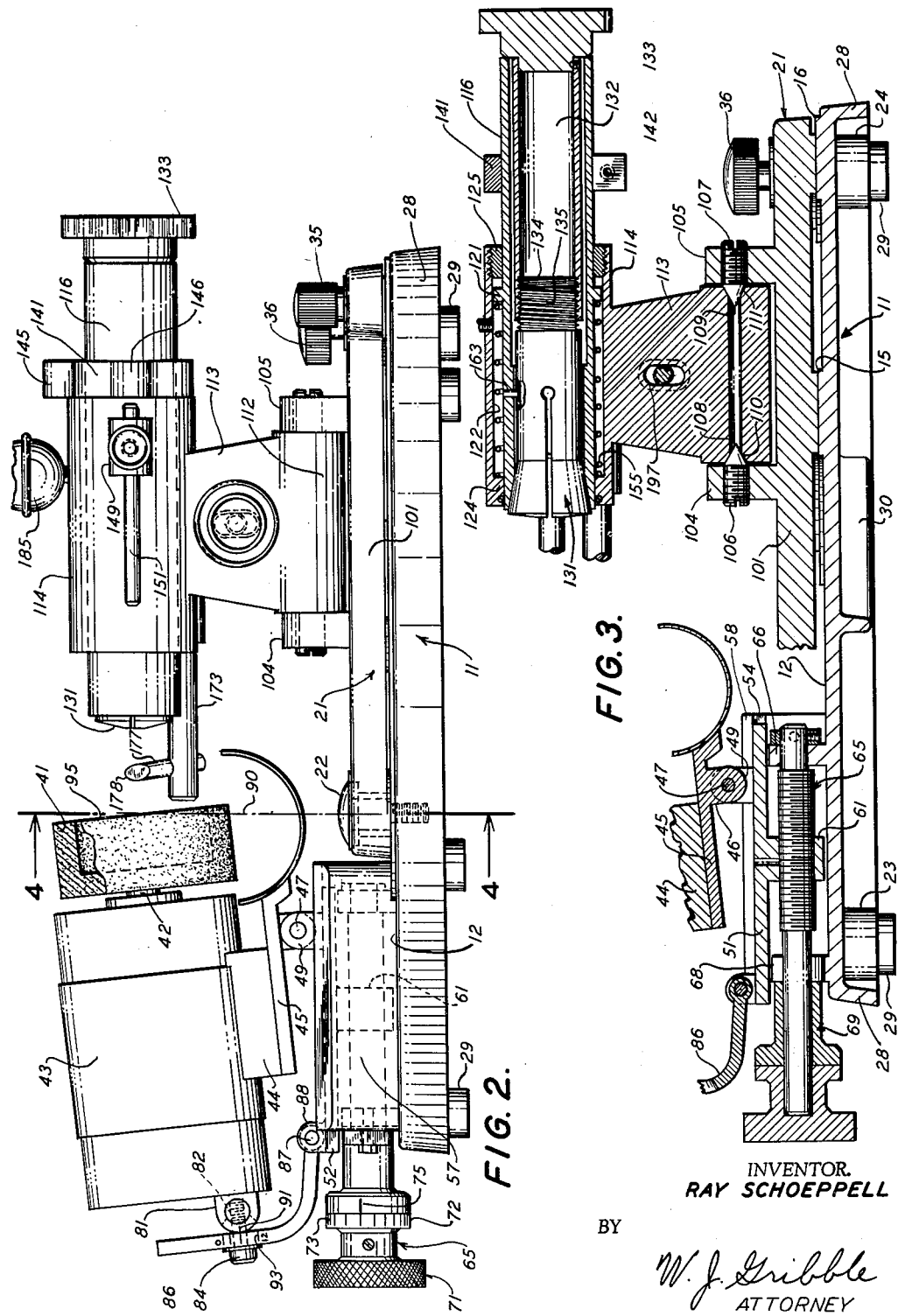

3,117,399
METHOD AND APPARATUS FOR TOOL GRINDING

Ray Schoeppell, Pasadena, Calif.; Berniece Beare, executrix of said Ray Schoeppell, deceased, assignor, by decree of distribution, to Berniece Beare and Elmer Beare, jointly
Filed Aug. 8, 1961, Ser. No. 130,062
8 Claims. (Cl. 51—123)

The invention relates to tool grinding and more particularly to methods and tool grinders in which the workpiece or tool is manually advanced with respect to the grinding or cutting wheel.

Small and medium size machine shops, particularly job shops, normally do not have a continuous production line, but, rather, afford facilities to those seeking short run quantities. Such shops are faced with a problem when it comes to forming or resharpening special tools. Such shops use rather large quantities of end mills, forming tools, sheet metal drills and the like. Usually the shop facilities are such that it is not economical for the shop to maintain its own tool grinding equipment. Machinery may have to sit idle while tools are at a special facility being resharpened. Partly dulled tools are used to avoid machine "down-time" leading to an inferior product, at least in terms of surface finish.

I have invented a method and apparatus which is economical, efficient and precise so that even small shops may be afforded a tool grinder that grinds and sharpens common tools such as end mills, sheet metal drills and so forth. The apparatus of the invention contemplates a tool grinder which comprises a base and a carriage with a vertical pivot securing the carriage to the base to move arcuately thereon. A tool holder mounts or grips the tool to be sharpened and is in turn supported by mounting means on the carriage. The tool holder is so supported within the mounting means that it may reciprocate with respect to the vertical pivot and also be arcuately displaceable in a plane perpendicular to the line of its reciprocation. The tool holder also rotates within the mounting means, and means are preferably attached to the mounting means for guiding or limiting such rotation. A grinding wheel is rotatably held by a support on the base. The support is such that the wheel may reciprocate with respect to the carriage vertical pivot and be displaced arcuately as desired in a vertical plane parallel to the path of reciprocation. Workpiece contact means, preferably supported by the tool holder mounting means, is adapted to guide a workpiece properly into cutting engagement with the grinding wheel.

Preferably special additional apparatus is attached to the components just described to form a combination suitably benefiting from the abovedefined particular freedoms of motion that the grinding wheel and tool holder have. In a preferred form of the embodiment a bias spring opposes the reciprocating motion of the tool holder in the direction toward the carriage vertical pivot. Means such as a split nut and a screw fixed at one end are also preferably provided to limit the arcuate or rocking motion of the tool holder transverse to the line of its reciprocation.

In the preferred embodiment the carriage is movable through an arc of 90° horizontally along ways upon the upper surface of the base. Thus a number of approach angles may be made to the cutting surface of the grinding wheel. The cutting surface of the wheel and its plane of rotation are adjustable both with respect to the pivot point of the carriage and arcuately with respect to the path of reciprocation of the tool holder. Thus the rapid sharpening of drill flutes at an angle selected for the material in which the drill is to be used may be quickly accomplished. The negatively pitched cutting ends of sheet metal drills and of end mills may be done on the inventive apparatus in accordance with the process of the invention.

The process contemplates the steps of aligning the flute ends of a cutter with the corner of a grinding wheel so that the flutes extend substantially horizontally across the wheel face, then fixing the attitude of the flute ends with respect to the mount holding the cutter. Then beginning with the outer edge of the flute end, the cutter is swung across the face of the wheel until the cutter center is contacted by the wheel. The cutter is then swung back, reversed in attitude with respect to its mount, and the opposite flute end is cut from outside to center by swinging the cutter and its mount in an arc across the corner of the wheel.

These and other advantages of the invention are apparent from the following detailed description and drawing in which FIG. 1 is a plan view of a preferred embodiment of the invention;

FIG. 2 is a side elevation of the embodiment of FIG. 1 with the tool holding carriage thereof swung into the position shown by the broken lines of FIG. 1;

FIG. 3 is a longitudinal vertical section taken along line 3—3 of FIG. 1;

FIG. 4 is a fragmentary sectional elevation taken along line 4—4 of FIG. 1;

FIG. 5 is a fragmentary sectional elevation taken along line 5—5 of FIG. 1;

FIG. 6 is an enlarged fragmentary sectional elevation similar to FIG. 5;

FIG. 7 is a schematic plan view illustrating a step in the process of the invention;

FIG. 8 is a schematic sectional elevation showing a further step in the process;

FIGS. 9 and 10 are schematic sectional views showing conventional tool configurations; and FIG. 11 illustrates a typical engraving tool.

The preferred embodiment shown in FIGS. 1 through 6 comprises a base 11 having an upper surface 12 from which arcuate carriage ways 15 and 16 rise.

Inner way 15 has a pair of stop pins 18, 19, one pin at each extreme of its extent. The pins limit arcuate travel of a tool holder carriage 21. The carriage is pivotably secured to the base by a vertical pivot 22.

The base has bosses 23, 24, 25, 26 depending coextensively with a base skirt 28. The skirt forms a continuous periphery about the base. Each boss is tapped so that a support pad 29 may be secured at each boss to support the base upon any convenient surface. Suitable stiffening rib such as a rib 30 in FIG. 3 may be provided on the underside of surface 12.

The outer way 16 has a plurality of reamed holes 31 extending downwardly from the way surface. The holes 31 are equally spaced arcuately along the extent of the way. A plurality of tapped holes 33 are equally spaced arcuately along the extent of way 16, and spaced from each reamed hole. The reamed holes receive a locating pin 35 of tool holder carriage 21 and the tapped holes receive a locking screw 36 of the carriage.

The reamed and tapped holes may be located to suit the particular user of the tool grinder. Those in the illustrative embodiment are spaced along way 16 to provide tool holder placement at angles of 0, 15, 30, 45, 60, 75 and 90 degrees to the cutting face of a grinding wheel 41.

The wheel is locked on a drive shaft 42 of a high speed motor 43. Preferably the cutting wheel is of a drum type. A block 44 depends from the lower case of the motor and is fixed to a rocker plate 45. A rocker tongue 46 depends below the plate and receives a pivot pin 47 through tongue aperture 48. The pin extends from the tongue to seat in a clevis 49 of a motor slide 51. The motor slide is a substantially rectangular block having beveled opposite side edges 52 fitting slidably into spaced horizontal ways 54. Ways 54 are formed in upstanding spaced parallel rails 57, 58 secured to surface 12 of the base. The rails extend toward carriage vertical pivot 22 and are adjacent straight edge 28A of the base. Ways 54 are sufficiently above surface 12 of the base to provide clearance for a nut 61 depending below the slide. A motor adjustment screw 65 is threadably engaged with nut 61 and journaled at one end in a first web 66 extending between rails 57, 58. The screw extends outwardly through a second web 68 and an indexing collar 69 fixed to the second web. Adjustment screw 65 terminates in a handle 71 having a drum portion 72. The periphery of the drum portion is marked with graduations 73 representative of the lineal distance traversed by the motor and grinding wheel for each 360° rotation of the motor adjustment screw. A mark 75 on the indexing collar serves to index the graduations.

An arcuate boss 81 is fixed to the rear of the motor casing. The boss has internal threads 82 to engage a lock screw 84. An L-shaped indexing finger 86 is mounted by a pivot pin 87 to a clevis U 88 fixed to the rear of the motor slide. The L-shaped finger has an elongate aperture 89 through which the lock screw passes to the arcuate boss. When the lock screw is loosened, the motor and the grinding wheel may be rocked about pivot pin 47 to displace the grinding wheel arcuately with respect to upper surface 12 of base 11, and with respect to a vertical extension 90 of the axis of vertical pivot 22 of the carriage. The arcuate boss may have a central indexing line 91, and the side of the L-shaped finger may have suitable lines indicating degrees of arcuate displacement. The lines 93 on the illustrative embodiment indicate 3° intervals of arc.

From the foregoing description it may be seen that the motor and the grinding wheel mounted to it may be reciprocated with respect to the vertical pivot axis of the carriage and may be adjusted arcuately in a vertical plane that is parallel to the line of reciprocation of the motor. These motions permit fine adjustment of the relationship between a front face 95 of the drum type grinding wheel and a workpiece supported by the carriage.

Carriage 21 has a carriage base 101 through which the previously described locating pin 35 and locking screw 36 protrude to register within the reamed and tapped holes of grinder base 11. The carriage base is generally elongated in configuration, extending longitudinally from the vertical pivot. A pair of spaced posts 104, 105 mount tapered pivot pins 106, 107. The tapered ends 108, 109 of the pins extend toward each other on the inner sides of the posts. The pins seat in tapered mounting holes 110, 111 of a tool holder cylinder 112. A web 113 extends from the cylinder. The web is rectangular in general configuration and has substantially the same thickness as the posts. The web extends generally upwardly from the cylinder and supports a sleeve 114 in which a tool holder or quill 116 is reciprocable. As can be seen in FIG. 3, the quill has a central annular ring 121 which rides within a cylindrical cavity 122 within the sleeve. A sleeve lip 124 defines the cavity at the end of the sleeve nearest the carriage vertical pivot. A sealing nut 125 closes the other end of the cavity and affords a journal for the quill.

The quill itself is a cylinder with an inner configuration conventionally shaped to receive a standard collet chuck 131. A collet locking shaft 132 extends through the quill away from the carriage pivot. Shaft 132 terminates in a handle 133. The handle is used to rotate the collet locking shaft screw 134 with respect to the quill, engaging the threads 135 of the collet to open or close it. When chucking engagement is accomplished the handle also is used to rotate the quill within the sleeve.

A stop collar 141 is mounted about the quill outboard of the sleeve. The stop collar is split at 142, and may be bound to the quill by means of a lock screw 144. A pair of ears 145, 146 on the periphery of the stop collar, are 120° apart. Holes 147, 148 extend through ears 145, 146, respectively, in the direction of reciprocation of the quill within the sleeve. An apertured tab 149 extends from a side of the sleeve. The aperture 150 houses an alignment rod 151 slidably therein. The longitudinal center line of the rod coincides with the radial displacement of the apertures in the ears of the stop collar from the line of the quill. A locking screw 152 threadably engaged in the tab binds against rod 151. If proper arcuate registration is arranged by rotating the quill, the alignment rod may be moved after loosening locking screw 152 and enter into one of the apertures of the lock collar ears. Further rotation of the quill and the collet chuck contained therein is then precluded. Reciprocation of the quill however, through the sleeve with respect to the vertical axis of the carriage pivot, is still possible. The lock collar may be slidably displaced on the periphery of the quill to limit the reciprocation thereof through the sleeve.

Referring again to FIG. 3, a helical biasing spring 155 resides within the sleeve about the quill between the quill collar and the sleeve lip. The spring opposes displacement of the quill and the tool holding collet toward the grinding wheel. The spring urges the tool holder to the position shown in FIG. 1, in which a workpiece such as the end mill 161 is out of contact with grinding wheel 41.

A hardened pin 163 in the wall of the quill registers within the conventional longitudinal groove of the collet, fixing the collet against rotation with respect to the quill. Therefore, if the lock collar is securely gripped upon the quill and is held by an operator so that the quill does not turn, handle 133 may be turned relative to the quill and to the pin-fixed collet to engage and disengage the workpiece held within the collet.

On the side of the sleeve opposite tab 149 is a larger guide ear 171. The guide ear is set below the center line of the sleeve and forwardly on the sleeve. A guide rod 173 is slidably mounted in aperture 174 within the ear. The rod is slidable within the ear on a longitudinal path substantially parallel to the longitudinal axis of the sleeve. The guide rod may be fixed in longitudinal position by means of a lock screw 175. As best seen in FIGS. 1 and 2, a guide finger 177 mounted in an end of the guide rod extends therethrough at an angle to the longitudinal axis of the rod. One end of the guide finger is sharpened to a point 178 for making fine contact with the flutes of a drill or end mill or other tool held in the chuck of the quill. The guide rod is rotatable within ear 171, as well as being slidable therein. Guide finger 177 may be clamped within guide rod 173 in any convenient fashion, as by a binding screw 181 shown in FIG. 5. The point 178 of guide finger 177 may be located in any number of positions with respect to the longitudinal axis of the quill and chuck.

A top knob 185 enables the operator to swing the sleeve and the tool holding chuck in an arc about pivot pins 106, 107. Means limit or defeat such swinging motion. A single post 191 rises from the upper surface of carriage 21 to a height above that of pins 106, 107. The post is notched at its top to receive a rounded end 193 of a generally horizontally extending screw 195. A pin 196 extends through the post across the notch and mounts the screw pivotably to the post. Web 113 of the tool holder has a vertically elongated slot 197 centrally located therein. The screw extends through the slot. Both edges of the slot are chamfered.

An adjusting nut 198 resides on screw 195 between the post and the web. A split nut 199 is threadably engaged with the free end of the screw on the opposite side of web 113. Thus, as viewed in FIG. 4, adjusting nut 198 limits counterclockwise swinging of the tool holder assembly about pivots 106, 107, and split nut 199 may be positioned to limit clockwise motion of the tool holder assembly. As shown in FIG. 4, the tool holder assembly is locked in position because each of nuts 198, 199 is tightened against web 113.

The foregoing description has set forth the freedom of movement of the various components of the tool grinder of the invention and the limitations and control thereof. The motor used is a fractional horsepower motor preferably ⅓ horsepower and capable of 5,000 revolutions per minute, giving the requisite surface speed of a 3" diameter grinding wheel. The motor, and therefore the grinding wheel, can both rock and reciprocate, as can the tool holder and the workpiece therein. Additionally the relationship between the axis of rotation of the grinding wheel and the axis of reciprocation of the tool holder may be changed between 0°, or alignment, and 90°, or transverse position.

FIGS. 4 and 6 illustrate the apparatus of the invention in use with an engraving tool. The tool 201 is shown in FIG. 4 extending from chuck 131 and having ½ of its protruding cylinder ground away to form a flat 202. A point has been shaped upon the tool by means not pertinent to the invention. It is now desired to sharpen the tool edges 204, 205 at the outer edges of flat 202. Preferably such tools are sharpened at an angle of 30° to the flat. This may be accomplished in the apparatus of the invention by means of lock collar 141 and its cooperation with rod 151. As shown in FIG. 4, the engraving tool is positioned for grinding flat 202 against flat face 95 of the grinding wheel. This is done when the carriage is in the full line position illustrated in FIG. 1. The engraving tool position is maintained by engagement between rod 151 and lock collar ear 146. The locking screw 152 is loosened. Rod 151 is removed from engagement with ear 146 and the entire quill and collet rotated about its axis within sleeve 114 until lock collar ear 145 is in alignment with rod 151. Then rod 151 is engaged with aperture 147 of ear 145 and again locked in that position. This orients the engraving tool in the position shown in FIG. 6. Thus, as made evident by the broken lines 41A representing the drum grinding wheel, a cutting edge may now be ground at edge 204 of the engraving tool by advancing the motor and grinding wheel by means of adjustment screw 65. The engraving tool is then reversed within the collet and the process repeated to sharpen edge 205. The quill and collet are reciprocated so that the entire edge to be sharpened is moved across face 95 of the grinding wheel.

FIGS. 9 and 10 illustrate schematically configurations of two conventional cutting tools. FIG. 9 represents the end configuration of a sheet metal drill. Commonly such drills have a central point 211 which projects a small increment 212 beyond the axial extent of flute ends 213, 214. This is to provide some centering action of the drill in the sheet metal before flute ends 213, 214 incise the metal. Note that there is a negative pitch to the ends of flutes 213, so that the face of the sheet metal drill is concave.

FIG. 10 illustrates in similar fashion the end configuration of a two-fluted end mill. Edges 218, 219 of the two flutes extend axially outwardly beyond the recessed center 221 of the end mill.

Both of these configurations may be obtained through use of the method and apparatus of the invention. FIGS. 7 and 8 illustrate the technique for obtaining negative or reverse pitch at the end of cutting tools. In FIG. 7 the face 95 of grinding wheel 41 is tilted at a slight angle to the vertical by adjustment of the motor about pivot 47, and locked in position by lock screw 84 and L-shaped finger 86. The angle of tilt of the grinding wheel determines the rake angle of the end of the flutes. In FIG. 7 a workpiece which may be an end mill 225 is schematically represented in contact with a corner edge 95A of the grinding wheel. The carriage and workpiece 225 are at an angle of 15° to the axis of rotation of the grinding wheel. While this is a preferred angle, the operation of grinding the end of a two-fluted end mill may be done at any angle. However, if the end mill has four flutes this operation should be performed at a position 15° removed from that illustrated in FIG. 1, or 75° out of alignment with the axis of the motor. Such orientation is necessary to clear the other flutes during grinding of one.

Referring again to FIGS. 7 and 8, the first step after aligning the carriage is to set the attitude of the flute end to be sharpened. The attitude is set by means of guide finger 177. The mill flute end indicated by line 227 is shown in FIG. 8 approximately parallel to a radial line between a contact point 228 on edge 95A and the center of the grinding wheel. Guide finger 177 engages the inward spiral of the flute in the manner shown in FIG. 5. The center of the end mill end is brought into contact with edge 95A. The tool holder assembly adjustment nut and split nut are set. The split nut 199 is positioned to stop arcuate motion of the assembly when the end mill end center reaches point 228. The adjustment nut 199 is backed away from tool holder web 113 to allow the tool holder to be rocked, or pivoted about pivots 106, 107. The tool holder is then rocked to bring end mill flute edge 218 in contact with the grinding wheel edge 95A. Stop collar 141 is set to limit wheelward motion of the quill. Relative orientation of the end mill in the tool holder is maintained by the guiding effect of finger 177. The grinder is started, and the tool holder rocked counterclockwise as viewed in FIG. 8. Contact is maintained between end mill and wheel as the mill is moved across the grinding corner from position 231 to position 232.

Due to the arcuate path of the end mill with respect to the wheel, the end mill flute edge engages the wheel differently from the engagement therewith of the end mill end center. Relative to a horizontal through the center of wheel rotation, the flute edge strikes a point 229 higher than point 228. Since the grinding wheel slopes away from the tool holder from bottom to top, if the advance of the tool holder is arrested by stop collar 141, less material of the end mill end is removed near the flute edge, and more near the flute center 221.

A reverse or negative pitch of the end mill of one and one-half degrees results when the slope of the wheel face is 6 degrees from vertical and the attitude of the flute ends when first referenced with respect to the wheel is substantially horizontal. As the mill is turned counterclockwise in FIG. 8 to change the flute end attitude, the pitch approaches zero.

It can be realized from the foregoing that it would only be necessary to change the split nut position to arrest arcuate tool holder motion sooner to achieve the configuration shown in FIG. 10, typical for sheet metal drills. The slightly deeper cut necessary can be made by swinging the drill end across the grinding wheel one or more times, with the split nut precluding removal of the material at the center to achieve point 211.

As has been described, the apparatus of the invention may be used to sharpen drill and end mill flutes, engraving tools and related forming tools. Radial cutting bits may be formed by using the ability of the carriage to revolve about its vertical pivot. Some end mills, specifically those of carbaloy, have straight instead of spiral flutes. Such mills may be sharpened in the same manner as are engraving tools.

The apparatus and method of the invention lend themselves to many operations other than those exemplary ones described to illustrate the invention. Many such operations within the scope of the invention will occur to those skilled in the art. Therefore I do not wish the invention to be measured by the illustrative specifics, but rather by the appended claims.

I claim:

1. A tool grinder comprising a base, a carriage, a vertical pivot securing the carriage to the base to move arcuately thereon, a tool holder, mounting means supporting the tool holder on the carriage so that the tool holder may reciprocate with respect to the vertical pivot, said mounting means being arcuately displaceable transversely of a vertical plane passing through the line of reciprocation, means for rotating the tool holder within the mounting means, means limiting such rotation, a rotary grinding wheel, a support rotatably holding the wheel from the base, said support being adapted to reciprocate to move the wheel toward the vertical pivot and selectively to displace the wheel arcuately in a vertical plane parallel to the path of reciprocation of the grinding wheel, and means on the tool holder mounting means for guiding a tool into cutting engagement with the grinding wheel.

2. A tool grinder comprising a base, semi-circular ways on the base, a carriage, a vertical pivot securing the carriage to the base to move arcuately on the ways thereon, a tool holder, mounting means supporting the tool holder on the carriage and adapted to reciprocate the tool holder with respect to the vertical pivot, said mounting means being arcuately displaceable transversely of a vertical plane passing through the line of reciprocation, means for rotating the tool holder within the mounting means, means limiting such rotation, a rotary grinding wheel, a motor drive for the wheel, a support holding the motor and wheel from the base, said support being adapted selectively to reciprocate the wheel with respect to the vertical pivot and selectively to displace the wheel arcuately in a vertical plane parallel to the path of reciprocation of the grinding wheel, and means on the tool holder mounting means for guiding a tool into cutting engagement with the grinding wheel.

3. Apparatus in accordance with claim 2 in which the means supporting the tool holder on the carriage comprises a horizontally disposed sleeve, a web supporting the sleeve, pivot mounts on the carriage about which the web and sleeve are arcuately displaceable, a quill retaining the tool holder and reciprocable within the sleeve, and means on the sleeve retaining the quill rotatably therein.

4. Apparatus in accordance with claim 3 in which the quill is spring loaded against horizontal linear motion toward the grinding wheel.

5. Apparatus in accordance with claim 3 in which the means limiting the rotation of the tool holder within the mounting means comprised a horizontally slidable rod on the side of the sleeve, a stop collar fixable on the quill, arcuately spaced ears on the stop collar, an aligned aperture in each ear radially oriented to coincide with the extension of the rod from the sleeve so that the ears are slidable along the rod, and means fixing the rod selectively in retracted or extended position so that rotary motion of the quill to which the stop collar is fixed is limited by engagement of rod and ear aperture while horizontal motion of the quill is free.

6. A process for grinding negatively pitched fluted cutter ends comprising the steps of aligning the cutter axis at a slight relatively downward angle to the plane of rotation of a grinder wheel, positioning a linear flute end with reference to a radius of the grinding wheel and so that an outer edge of the flute end is more remote from the grinding wheel center than is the cutter center, fixing the relative attitude of the flute end with respect to a cutter holder pivot located substantially perpendicularly lower than the reference grinding wheel radius, and rocking the cutter about the pivot in a direction away from the grinding wheel center of rotation in contact with the grinding wheel so that the cutter end is ground more deeply at its center than at the outer edge.

7. A tool grinder comprising a base, a drum grinding wheel, a motor for revolving the wheel, means mounting the motor to the base for displacement parallel thereto and for angular displacement perpendicularly with respect thereto, semi-circular ways on the base, a carriage movable along the ways, a vertical pivot securing the carriage to the base, a tool holder mounting means supporting the tool holder to the carriage so that the holder may be displaced toward and away from the grinding wheel, said means being arcuately displaceable from the line of displacement toward and away from the grinding wheel, means for rotating the tool holder within the mounting means, means limiting such rotation, and tool contact means on the mounting means for guiding a tool into cutting engagement with the grinding wheel.

8. A tool grinder comprising a base, semi-circular ways on the base, a carriage, a vertical pivot securing the carriage to the base to move arcuately on the ways thereon, a tool holder; a tool holder mount having a horizontally disposed sleeve, a web supporting the sleeve, pivot mounts on the carriage about which the web and the sleeve are arcuately displaceable, a quill retaining the tool holder and reciprocable within the sleeve, means on the sleeve retaining the quill rotatably therein, the sleeve, quill and web mounting the tool holder to be displaceable arcuately transversely to the vertical pivot and the sleeve and quill being adapted to reciprocate the tool holder with respect to the vertical pivot; means for rotating the tool holder within the tool holder mount; means limiting such rotation comprising a horizontally slidable rod on the side of the sleeve, a stop collar fixable on the quill, arcuately spaced ears on the stop collar, an aligned aperture in each ear radially oriented to coincide with the extension of the rod from the sleeve so that the ears are slidable along the rod, and means fixing the rod selectively in retracted or extended position so that rotary motion of the quill to which the stop collar is fixed is limited by the engagement of the rod and an ear aperture while horizontal motion of the quill is free; a rotary grinding wheel, a motor drive for the wheel, a support holding the motor and the grinding wheel from the base, said support being adapted selectively to reciprocate with respect to the vertical pivot and selectively to displace the wheel arcuately in a vertical plane parallel to the path of reciprocation of the grinding wheel, and means on the tool holder mounting means for guiding a tool into cutting engagement with the grinding wheel.

References Cited in the file of this patent

UNITED STATES PATENTS

| | | |
|---|---|---|
| 2,245,858 | Hornberger | June 17, 1941 |
| 2,275,483 | Parker | Mar. 10, 1942 |
| 2,413,436 | Dawson | Dec. 31, 1946 |
| 2,482,802 | Sanders | Sept. 27, 1949 |
| 2,494,825 | Melin | Jan. 17, 1950 |
| 2,858,649 | Scheubeck | Nov. 4, 1958 |